United States Patent Office 3,682,586
Patented Aug. 8, 1972

3,682,586
PROCESS FOR THE DETERMINATION OF CREATININE BODY FLUIDS
Gehard Ertingshausen, Easton, Conn., and Diane L. Fabiny, Mount Vernon, N.Y., assignors to Union Carbide Corporation, New York, N.Y.
No Drawing. Filed Mar. 10, 1971, Ser. No. 123,044
Int. Cl. G01n 33/16
U.S. Cl. 23—230 B    4 Claims

ABSTRACT OF THE DISCLOSURE

An automated reaction rate method for the determination of creatinine in body fluids. The process employs reacting the creatinine-containing fluid with picrate in an alkaline solution and thereafter measuring the reaction rate within a specified time interval after the reaction commences by means of a centrifugal analytical photometer. Inasmuch as a linear relationship exists between the creatinine concentration and the initial change of absorbance, the concentration in an unknown sample can be conveniently calculated by comparison with the results obtained from the simultaneous measurement of a sample of known concentration.

---

This invention relates in general to a process for the determination of creatinine in body fluids. In one aspect, the invention relates to a process for the determination of creatinine in blood serum. In a further aspect the invention relates to a process for the determination of creatinine using a centrifugal analytical photometer.

In recent years the need for more sophisticated quantitative analytical methods has increased markedly due to the numerous microanalytical studies in biochemical research, routine clinical testing for physicians and hospitals, and the like. In addition to the increased demand for new methods of analysis, in certain fields it is often highly desirable that the method be simple to perform, be rapid and yet provide consistently reliable results. This is particularly important for clinical testing of body fluids where a proper diagnosis or treatment depends upon the information provided by analysis. However, few methods are available which can rapidly and accurately handle the increasing number and varied test desired by clinicians. For example, the determination of creatinine in body fluids, such as serum, is assuming a steadily growing share of the clinical laboratory's work load. In spite of the advent of many new chemical approaches to the problem, the classical Jaffé reaction has remained the method of choice. This method involves the measurement of the intensity of a red color formed by the reaction of creatinine with picrate in an alkaline solution. However, the reaction products are complex and the results are easily influenced by temperature and the presence of a variety of interferences. Most of the numerous interferences can be removed by a combination of deproteinization and specific adsorption of creatinine on fuller's earth or ion exchange resin. Specific bacterial destruction of creatinine and measurement of Jaffé positive chromogens before and after the exposure to the NC culture has been achieved. Dialysis in continuous flow systems represents another though less specific method to separate interferences before the Jaffé reaction occurs. However, all of these pretreatments are time consuming and detract from the desirability of the method.

It is therefore an object of this invention to provide a process wherein many of the disadvantages indicated above are eliminated or minimized. A further object is to provide a process for the determination of creatinine which is accurate and avoids prior treatment of the sample to remove Jaffé positive interferences. Another object of the invention is to provide a process for the determination of creatinine which is much more rapid then those currently in use. A further object is to provide a process which utilizes a centrifugal analytical photometer. These and other objects will readily become apparent to those skilled in the art in the light of the teachings herein set forth.

In its broad aspect the invention is directed to a process for the determination of creatinine in body fluids. The process comprises the steps of:

(a) Forming a mixture of a creatinine-containing fluid and a picrate in an alkaline solution;

(b) Measuring on a centrifugal analytical photometer a first linear reaction rate within a specified time from the commencement of the reaction;

(c) Comparing the first linear reaction rate with at least one other linear reaction rate obtained simultaneously under the same conditions on fluids containing a known concentration of creatinine, and (d) Determining the amount of creatinine in the creatinine-containing fluid.

The process of this invention provides an accurate and rapid method for the quantitative determination of creatinine in body fluids. In view of the fact that a linear relationship exists between the initial change of absorbance and the creatinine concentration, and that most of the other Jaffé positive components of serum react with significantly different reaction velocities an accurate analysis can be obtained while their interference with the creatinine reaction is at a minimum. Therefore, it was possible to reduce interferences by most of the known Jaffé positive serum constituents to a minimum by optimal selection of the time interval during which the reaction rate was measured. Accordingly, the method does not require deproteinization of adsorption of creatinine on fuller's earth or ion exchange resin. Results of precision studies and correlation with a known method requiring adsorption of creatinine on ion exchange resin indicated that this method was of equal accuracy. However, in contrast to the prior art methods which require as long as thirty minutes reaction time before a reading is taken, the present method can measure the concentration in a matter of seconds. This, of course, is extremely desirable where many samples are to be analyzed.

As previously indicated the process comprises the determination of linear reaction rate by measurement of changes in absorbance due to the interaction of creatinine and a picrate in an alkaline solution. The alkaline picrate solution is conveniently prepared by mixing one volume 2.5 N sodium hydroxide with five volumes of a saturated picric acid solution and thereafter diluting the mixture. For example, 1.1 milliliter of 2.5 N NaOH when mixed with 4.4 milliliter of saturated picric acid diluted to 20 milliliters provide a suitable alkaline picrate reagent.

Fluids containing creatinine concentrations of up to 10 milligrams/100 milliliters exhibit a linear absorbance when reacted with the picrate reagent. Hence, it is possible by the method of this invention to accurately determine the amount of creatinine present over a relative wide concentration range.

In practice it has been found convenient to employ 50 microliter aliquots of samples having creatinine concentrations within the range up to 10 milligrams per hundred ml. with 400 microliters of the alkaline picrate. The amount of sample and picrate reagent can, of course, be varied depending upon the concentration of reagent, amount of creatinine present and the particular analyzer employed.

As indicated, the linear reaction rate is measured within a specified time after the commencement of the reaction. In practice it has been found that transfer and mixing of the sample and picrate reagent are complete after 1.5 seconds and from then on data can be taken at specific time intervals. For example, it has been found that accurate results can be obtained if a first measurement is taken 20 seconds after starting the rotor spin and a second reading taken 60 seconds later.

As indicated previously, the process of this invention utilizes a centrifugal analytical photometer. These multi-station analytical photometers which utilize a centrifugal field have become available for the rapid microanalysis of a wide variety of liquids such as body fluids, e.g., blood serum, food products, and the like. Since numerous analyses can be performed rapidly and simultaneously these devices are of particular interest wherein a large number of samples is involved or a variety of tests on one sample is desired. Moreover, since these devices allow the use of relatively small volumes of reagents, i.e., in the microliter range, the use of expensive reagents can be minimized.

One such device which utilizes a centrifugal field in microanalytical studies is described in United States Pat. 3,555,284. This device employs the principle of double-beam spectrophotometry wherein absorbancies of a liquid sample and a reference solution are intercompared. The system is basically a series of cuvets arranged around the periphery of a rotor so that when it is spun, centrifugal force transfers reagents and samples to the cuvets where the concentration is measured spectrophotometrically. A sample loading disk is provided which consists of rows of cavities arranged concentrically. Reagents are placed in the inner-most cavity and serum samples in the center cavity of the sample loading disk which is then indexed and positioned in the rotor with each reagent and serum sample having its respective cuvet. As the rotor is accelerated, centrifugal force moves the reagents and sample to the outer-most cavity where they are transferred through a small channel to the cuvet. During the transfer, the reagent and sample mix. The filled cuvets rapidly spin past the fixed light beam and the transmission of light is measured.

For the analysis of creatinine by the process of this invention a centrifugal rotary photometer supplied by Union Carbide Corporation under the trademark "CentrifiChem" was utilized. In this instrument, a Teflon disk containing samples and reagents is inserted into a rotor with 30 radially arranged cuvets. When the rotor starts spinning, the reagent rises from every individual reagent well up to individual sample cavities, and the sample reagent mixture is transferred into the single cuvets within 1.5 seconds. One cuvet containing water is used as a reference when the cuvets spin past the stationary light beam of a spectrophotometer which measures the absorbance and displays it on an oscilloscope. Two sets of digitized absorbance readings of each cuvet can be stored simultaneously and the difference between them processed in a computer. A reading is taken of the first absorbance after start and the time interval after which the second measurement occurs also noted. A number of readings can be taken after the initial one. In the rate mode the absorbance change per interval is expressed in $\Delta A/min$. In the end point mode the absorbance differences between initial and every individual subsequent set of readings is measured. This approach allows compensation for cuvet to cuvet variations and for serum and reagent blanks if readings are taken before the reaction has started to a measurable degree. A blank reading recorded in a preceding run can be used as initial reading in a subsequent run. After a selected time interval has elapsed, the readings are printed out. The last set of data stored in the memory can be multiplied by means of the computer which permits direct print-out in concentration units. The rotor is thermostated within $\pm .1°$ C. in an air bath.

The following example is illustrative:

EXAMPLE I

For the rate method run on the analyzer, the Teflon disk sample holder is loaded with 50 $\mu$l. (microliter) aliquots of various creatinine standards (1–10 mg./100 ml.) or sera in the sample cavities and 400 $\mu$l. alkaline picrate in the inner-most cavities. The reference position (0) contains 400 $\mu$l. distilled water in the inner cavity The initial reading of all 30 cuvets is taken 20 seconds (=To) after starting the rotor spin. The time interval is one minute ($\Delta T$) between readings. The change between 20 and 80 seconds is used to determine creatinine concentrations based on within run standards. The test is run with 520 nm. interference filter.

According to Beer's Law the absorbance of a solution is proportional to the concentration of the solution's chromophore as long as the concentration is low. Accordingly, the concentration of alkaline picrate formed in the described reaction is at any time proportional to the absorbance it generates.

$$Absorbance \times F = Concentration$$

In order to convert absorbance into concentration the absorbance has to be multiplied with a factor F. In the analyzer employed this is achieved by setting the appropriate factor on a digital switch which automatically multiplies the absorbance whereupon concentration units will be printed out directly.

During an analytical run a standard of known creatinine concentration is always run with the samples. If the results for the standard show slight variations from the correct concentrations, a setting of a digital switch is changed until the correct value is printed out. The same correction is then automatically applied to the results from the unknown sample.

In order to verify the accuracy of the method a reference method, as described by A. Stoten, J. Med. Lab. Technol. 25, 240 (1968) was employed. To 5 and 6 mg. resin in a test tube are added 200 $\mu$l. water and 100 $\mu$l. of creatinine standard. Tubes are shaken intermittently for 30–45 min. to allow the creatinine to be adsorbed and then washed with $2 \times 1.0$ ml. $H_2O$. The water is decanted and 1.5 ml. alkaline picrate are added to elute creatinine. The resin is resuspended several times over 30 minutes, and the decanted supernatant solution is read at 520 nm. on the Gilford Model 200–N spectrophotometer.

Standard solutions with concentrations varying between 1 and 10 mg. percent creatinine were analyzed at 25° C. The initial reaction rates, indicated by the absorbance change for several time intervals after initiation of a run, were plotted against the concentration of creatinine, and a perfectly linear relationship was obtained for all the time increments.

Interferences by several substances were studied. When aqueous solutions containing 7.0 g. percent albumin were reacted with picrate reagent, no measurable absorbance change due to the protein occurred within the first 1.5 minutes. Ion free serum (6.7 g. percent protein) was later substituted as a protein solution. The interference detected represented less than .05 mg. percent creatinine for rates taken between 20 and 100 seconds. The interference caused by glucose was found to be completely negligible during the same time interval. Similar experiments conducted with acetone and $\beta$-hydroxybutyric acid also showed no interfering absorbance. For aceto acetic acid at ten times its physiologic concentration, the interference was equivalent to only 0.05 mg. percent creatinine. The reaction between aceto acetate and picrate is close to completion when the first absorbance reading is taken. Only the remainder of unreacted aceto acetate contributes to the interference.

Finally, interferring chromogens were added to creatinine standards and their total contribution to the linear reaction rate between 20 and 80 seconds did not exceed the equivalent of .08 mg. percent creatinine.

Although the invention has been illustrated by the preceding disclosure, it is not to be construed as being limited to the particular embodiments or materials disclosed therein. Rather, the invention encompasses the generic area hereinbefore disclosed. Various modifications and embodiments thereof can be made without departing from the spirit and scope thereof.

What is claimed is:

1. A process for the determination of creatinine in a creatinine-containing fluid which process comprises the steps of:
    (a) forming a mixture of said creatinine-containing fluid and a picrate in an alkaline solution;
    (b) measuring by means of a centrifugal analytical photometer a first linear reaction rate within 80 seconds from the commencement of the reaction;
    (c) comparing the first linear reaction rate with at least one other linear reaction rate obtained simultaneously under the same conditions on fluids containing a known concentration of creatinine, and,
    (d) determining the amount of creatinine in said creatinine-containing fluid.

2. The process of claim 1 wherein said creatinine-containing fluid is a body fluid.

3. The process of claim 2 wherein said body fluid is blood serum.

4. The process of claim 1 wherein said picrate is formed by the reaction of picric acid and sodium hydroxide.

References Cited

UNITED STATES PATENTS

| | | | |
|---|---|---|---|
| 3,555,284 | 1/1971 | Anderson | 23—230 B X |
| 3,557,018 | 1/1971 | Scheverbrandt | 23—230 B X |

MORRIS O. WOLK, Primary Examiner

R. M. REESE, Assistant Examiner